United States Patent Office 3,119,749
Patented Jan. 28, 1964

3,119,749
PROCESS FOR PREPARING 1-DEHYDRO STEROIDS
Richard W. Thoma, Somerville, and John W. Ross, East Brunswick, N.J., assignors to Olin Mathieson Chemical Corporation, New York, N.Y., a corporation of Virginia
No Drawing. Filed Apr. 10, 1962, Ser. No. 186,311
4 Claims. (Cl. 195—51)

This invention relates to a process for preparing steroids and, more particularly, to an improved process for the enzymatic 1-dehydrogenation of steroids.

Prior to this invention, it was known that steroids saturated in the 1,2-position, could be 1-dehydrogenated enzymatically, either by including the steroid in a culture of a growing 1-dehydrogenating microorganism or subjecting the steroid to the action of cells of a 1-dehydrogenating microorganism separated from the growth medium, or 1-dehydrogenase enzyme separated from the cells of such microorganisms. Such processes are herein collectively referred to as "enzymatic 1-dehydrogenation." It has now been found that if the 1-dehydro derivative of a steroid of the 16α,17α-dihydroxy-3-keto-Δ⁴-pregnene series is the desired product, the conversion can be effected more advantageously if a water-soluble 16,17-cycloborate ester is employed as the steroid substrate.

It is an object of this invention, therefore, to provide an improved process for the enzymatic 1-dehydrogenation of a steroid of the 16α,17α-dihydroxy-3-keto-Δ⁴-pregnene series.

This object is achieved by the process of this invention which comprises subjecting, under aerobic conditions, a water-soluble 16,17-cycloborate ester of a steroid of the 16α,17α-dihydroxy-3-keto-Δ⁴-pregnene series to enzymatic 1-dehydrogenation.

The enzymatic 1-dehydrogenation can be accomplished either by including the steroid in a growing or mature culture of a microorganism known to effect 1-dehydrogenation of steroids, or by treating the steroid with the cells or mycelium of such a culture separated from the growth medium or 1-dehydrogenase enzymes separated from cells of such microorganisms.

Suitable microorganism include members of the genera: Corynbacterium (e.g., C. simplex), Nocardia (e.g., N. aurantia and N. asteroides), Bacterium (e.g., B. cyclooxydans), Mycobacterium (e.g., M. rhodochrous), Bacillus (e.g., B. sphaericus), Septomyxa (e.g., S. affinis), Didymella (e.g., D. lycopersici), Calonectria (e.g., C. decora), Fusarium (e.g., F. solani), Cylindrocarpon (e.g., C. radicicola), Pseudomonas (e.g., P. testosteroni), Sterptomyces (e.g., S. lavendulae), and also selected species of the genera: Protaminobacter, Alcaligenes, Alternaria, Ophiobolus and Pycinodithis.

If the microorganism is used per se, it is grown aerobically in a suitable nutrient medium, as known in the art; the steroid to be 1-dehydrogenated being added either at the beginning or sometime during the culturing process.

In general, the conditions of culturing the microorganisms for the purpose of this invention are the same as those of culturing microorganisms for the production of antibiotics or vitamins. Thus, the microorganism is grown in contact with (in or on) a suitable nutrient medium in the presence of an adequate supply of oxygen (air). A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distiller's solubles, peptones and/or yeast extract) or synthetic (i.e., composed of simple, synthesizable organic and inorganic compounds such as ammonium salts, alkali nitrates, amino acids or urea).

An especially advantageous form of the invention consists of collecting and using pre-induced cells of one of the 1-dehydrogenating microorganisms listed hereinbefore by the method described in U.S. Patent No. 3,022,226. In this event the 1-dehydrogenation is preferably conducted in the presence of an iodoacetate compound, such as iodoacetic acid, a salt thereof, such as an alkali metal salt (e.g., sodium iodoacetate and potassium iodoacetate), an alkaline earth metal salt, the ammonium salt, and an amine salt; or an ester thereof, such as a lower alkyl ester (e.g., methyl iodoacetate and ethyl iodoacetate) and a monocyclic aralkyl ester; the iodoacetate compound preferably being present in a concentration of about 0.001 molar to about 0.1 molar and optimally about 0.005 molar to about 0.02 molar. An adequate supply of oxygen is also provided during the 1-dehydrogenation procedure, preferably either by aerating or agitating the mixture, or both.

As steroid substrate, any water-soluble 16,17-cycloborate ester of a steroid of the 16α,17α-dihydroxy-3-keto-Δ⁴-pregnene series may be used. Such compounds include the alkali metal salts (e.g., the sodium and potassium salts) and the ammonium salt of the 16,17-cycloborate esters. Particularly preferred are steroids of the general formula

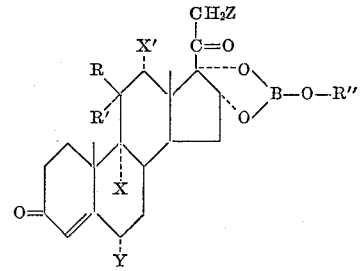

wherein R is hydrogen, R' is hydrogen or β-hydroxy, or together R and R' is keto; X and X' are hydrogen, halogen, hydroxy, lower alkoxy or lower alkyl, at least one X being hydrogen; Y is hydrogen, methyl, chloro or fluoro; Z is hydrogen, halogen, hydroxy or acyloxy; and R'' is a cation, preferably an alkali metal or ammonium.

Suitable steroid substrates include the alkali metal and ammonium salts of the 16,17-cycloborate esters of: 16α,17α-dihydroxyprogesterone, 16α,17α,21-trihydroxyprogesterone, 6α-methyl-16α,17α-dihydroxyprogesterone, 6α-chloro-16α,17α-dihydroxyprogesterone, 6α-fluoro-16α,17α-dihydroxyprogesterone, 16α,17α-dihydroxy-21-fluoroprogesterone, 16α,17α-dihydroxy-21-chloro-progesterone, 16α-hydroxyhydrocortisone, 16α-hydroxycortisone, 9α-halo-16α-hydroxyhydrocortisones (e.g., 9α-fluoro-16α-hydroxyhydrocortisone), 9α-halo-16α-hydroxycortisones, 12α-halo-16α-hydroxyhydrocortisones (e.g., 12α-fluoro-16α-hydroxyhydrocortisone), 12α-halo-16α-hydroxycortisones, 6α-methyl-16α-hydroxyhydrocortisone, 6α-methyl- 16α-hydroxycortisone, 6α-fluoro-16α-hydroxyhydrocortisone, 6α-chloro-16α-hydroxyhydrocortisone, 9α-halo-6α-methyl-16α-hydroxyhydrocortisones, 12α-halo-6α-methyl-16α-hydroxyhydrocortisones, 9α-halo-6α-fluoro-16α-hydroxyhydrocortisones (e.g., 6α,9α-difluoro-16α-hydroxyhydrocortisone) 9α-halo-6α-chloro-16α-hydroxyhydrocortisones (e.g., 6α,9α-dichloro-16α-hydroxyhydrocortisone), 11β,16α,17α-trihydroxyprogesterone, 11-keto-16α,17α-dihydroxyprogesterone, 9α-halo-11β,16α,17α-trihydroxyprogesterones (e.g., 9α-fluoro-11β,16α,17α-trihydroxyprogesterone), 9α-halo-11-keto-16α,17α-dihydroxyprogesterones, 12α-halo-11β,16α,17α-trihydroxyprogesterones, 12α-halo-11-keto-16α,17α-dihydroxyprogesterones, 21-halo-11β,16α,17α-trihydroxyprogesterones, 9α,21-dihalo-11β,16α,17α-trihydroxyprogesterones, 6α,9α,21-trifluoro-11β,16α,17α-trihydroxyprogesterone and 6α,9α,21-trichloro-11β,16α,17α-trihydroxyprogesterone; and esters of those steroids having a 21-hydroxy group. Particularly preferred are those esters formed with hydrocarbon carboxylic acids of less than twelve carbon atoms, as exemplified by the alkanoic acids of less than twelve carbon atoms, the alkenoic acids of less than twelve carbon atoms, monocyclic aryl carboxylic acids, monocyclic aryl lower alkanoic acids, cycloalkanecarboxylic acids and cycloalkenecarboxylic acids.

Since the steroid substrates of this invention, unlike conventional steroidal substances, are highly water soluble, they may be added to the 1-dehydrogenation medium as aqueous solutions. This difference affords one of the advantages of the instant process over those known in the art since it permits a greater concentration of substrate to be present in soluble form than was possible heretofore. Thus, prior to this invention the steroid was added preferentially in an organic solvent solution, such as a dimethylformamide solution. Such organic solvents are inhibitory to enzymatic 1-dehydrogenation and therefore limited the concentration of steroid that could be added to a 1-dehydrogenation system. Alternatively, the steroid was added in solid form, in which case the speed and extent of the reaction was limited by the rate of solution and ultimate solubility of the steroid. By use of the steroid substrates of this invention, however, concentrations as high as 0.0025 molar of steroid substrate can be used in procedures where the substrate is added to a dilute culture of the microorganism; and as high as 0.1 molar of steroid substrate can be used in procedures where the substrate is added to a system containing separated concentrated cells or 1-dehydrogenase enzyme. Preferably the concentration of substrate in the former system is about 0.0002 to about 0.002 molar; and in the latter, about 0.0002 to about 0.02 molar.

The steroid substrate, in aqueous solution, is added either prior to or during the culturing of the microorganism, if the microorganism is used per se, or to an aqueous medium containing the separated cells or cell-free 1-dehydrogenase enzyme and the iodoacetate compound, if this procedure is employed. After about 1 to about 48 hours, depending on the concentration of this steroid and enzyme, substantially all of the substrate has been converted to its 1-dehydro derivative. The resulting 16,17-cycloborate ester of the 1-dehydro derivative can then be recovered. Preferably, however, the medium is acidified (after removal of the cells or mycelium if a microorganism is used) to a pH of at least 4.5 and preferably about 2 to about 4, as by treatment with a mineral acid, such as sulfuric acid, to hydrolyze the 16,17-cycloborate ester group, thereby yielding the free 16α,17α-dihydroxy derivative. The desired steroid can then be recovered in the usual manner, as by filtration or centrifugation (if solid) or by countercurrent extraction.

The following examples illustrate the processes of this invention (all temperatures being in centigrade):

*Example 1*

*Nocardia restrictus* (Waksman Collection No. 545, Rutgers University, New Brunswick, New Jersey), is grown for four weeks at 25° on an agar slant of the following composition:

|  | G. |
| --- | --- |
| Beef extract | 1.5 |
| Yeast extract | 3.0 |
| Peptone | 6.0 |
| Glucose | 1.0 |

Distilled water to 1 liter.
Autoclaved 30 minutes at 121°.

One ml. portions of a suspension obtained by washing the surface of one slant with 5.0 ml. of sterile water are used to inoculate 50 ml. portions of the following medium contained in cotton-plugged 250 ml. Erlenmeyer flasks:

|  | G. |
| --- | --- |
| Peptone | 5.0 |
| Tryptone | 5.0 |
| Yeast extract | 5.0 |
| Glucose | 20.0 |
| $CaCO_3$ | 2.5 |

Distilled water to 1 liter.
Autoclaved 30 minutes at 121°.

The inoculated flasks are incubated at 25° with rotary mechanical shaking in a radius of 2 inches at 280 cycles per minute. After 23 hours, 6% (vol./vol.) is transferred to another set of flasks prepared as are the first. The second set of flasks is incubated in the same manner as were the first for 17 hours, when 0.25 ml. of a solution of 16α-hydroxy-9α-fluorohydrocortisone 16,17-cycloborate in N,N-dimethylformamide is added to each flask. The dimethylformamide solution contains 20 mg. of steroid/ml., and therefore 100 micrograms of steroid/ml. of culture is provided. Samples are taken 4.5 hours and 29 hours after addition of the steroid to the culture, adjusted to pH 3.0±0.05, and the free steroids are extracted with methyl isobutyl ketone, and subjected to paper chromatography in a benzene-ethanol-water Whatman No. 1 system. Thus, it is observed that 1-dehydrogenation is 70% complete in 4 to 5 hours and essentially quantitative in 29 hours or less.

*Example 2*

A lyophil vial culture of *Corynebacterium simplex* ATCC 6946 is used to inoculate a 250 ml. flask containing 50 ml. of the same medium as used in Example 1. The inoculated flask is incubated at 25° for 24 hours with rotary mechanical shaking (280 cycles per minute; 2 inch radius). Approximately 0.05 ml. portions of the medium are then used to inoculate several 50 ml. portions of medium of the following composition:

|  | G. |
| --- | --- |
| Yeastamin (Vice Products Corporation, Chicago) | 1.0 |
| $KH_2PO_4$ | 1.0 |
| $K_2HPO_4$ | 1.0 |
| Glucose monohydrate | 1.0 |

Tap water to 1 liter.
Autoclaved 20 minutes at 121°.

The second flask stage is incubated (in the same way as the first) for 48 hours, when 6% (vol./vol.) transfers are made to several flasks prepared as were the second stage flasks. Flasks of the third stage are incubated for 24 hours (in the same way as were the preceding flask stages) at which time each flask is supplemented with 1.0 ml. of solution containing sodium tetraborate (as borax, 23 mg./ml.) and 16α-hydroxy-9α-fluorohydrocortison (60 mg./ml.), the steroid being in solution as the cycloborate ester sodium salt. Thereby 600 micrograms of steroid/ml. is provided to the fermentation. At intervals, aliquots are taken, adjusted to pH 3.0±0.5 with concentrated phosphoric acid, the free steroid is extracted with methyl isobutyl ketone, and subjected to paper chromatographic analysis. Seventeen hours after steroid addition about 83% of the initial steroid is present as triamcinolone (16α- hydroxy-9α-fluoroprednisolone) and within 41 hours 1-dehydrogenation is essentially quantitative.

*Example 3*

A culture of *Corynebacterium simplex* ATCC 6946 is grown for seven days at 25° on an agar slant of the following composition:

|  | G. |
|---|---|
| Beef extract | 1.5 |
| Yeast extract | 3.0 |
| Peptone | 6.0 |
| Glucose | 1.0 |
| Agar | 15.0 |

Distilled water, 1 liter.
Autoclaved 30 minutes at 121°.

Three ml. aliquots of a suspension obtained from washing off the surface growth of a slant with 10 ml. of the following medium (F1):

|  | G. |
|---|---|
| KH₂PO₄ | 1.0 |
| Peptone | 10.0 |
| Yeast extract | 2.5 |
| Glucose | 30.0 |

Water, 1 liter.
pH 7.2 before autoclaving 30 minutes at 121°.

are used to inoculate 50 ml. portions of the same F1 medium contained in cotton-stoppered 250 ml. Erlenmeyer flasks. The flasks are incubated three days at 25° on a rotary shaker running at 280 c.p.m. with a 2 inch radius. The entire flask contents, are then transferred aseptically to 4 liter Erlenmeyer flasks containing 1 liter of the F1 medium. Three flasks (the F2 flasks) are incubated two days at 25° on a reciprocating shaker running at 120 c.p.m. with a one and one-quarter inch stroke. Six F2 flasks are used to inoculate 50 gallons of F1 medium in an aerated, agitated fermentation vessel. After 48 hours of cell growth, 15 g. of testosterone in 300 ml. of methanol are filter sterilized and added to the fermentation. Twenty-four hours later the cells are harvested by centrifugation, collected as a paste and stored in a freezer at −17°.

1-dehydrogenation of the 9α-fluoro-16α-hydroxyhydrocortisone 16,17-cycloborate ester is accomplished in a medium containing the following:

| Frozen cells | 3% (weight/volume). |
|---|---|
| K₂HPO₄ | 0.05 M. |
| Na₂H₂P₂O₇ | 0.05 M. |
| Sodium iodoacetate | 0.003 M. |

(At leg 12 and one-half an additional 2% of cells and 0.002 M sodium iodoacetate are added.) The reaction is carried out in a total volume of 50 ml. of medium in a 250 ml. Erlenmeyer flask. The steroid is prepared by mixing 200 mg. of a mixture of 82% 9α-fluoro-16α-hydroxyhydrocortisone and 12.2% 9α-fluoro-16α-hydroxyprednisolone, 2.4 ml. of methanol, and 25 mg. of Na₂B₄O₇·10H₂O dissolved in 0.4 ml. of water in a flask and heating at 95° in a steam bath. In approximately five minutes the material is solubilized and the cyclo-borate ester is mixed with 50 ml. of the medium described above, the pH is adjusted to 7.2 and the flask is placed on a shaker at 25°. Samples are drawn for chromatographic analysis and the progress of the dehydrogenation is as follows:

| Time | 9α-Fluoro-16α-hydroxy-hydrocortisone, mg./ml. | Triamcinolone, mg./ml. |
|---|---|---|
| 3.5 hours | 1.5 | 2.8 |
| 12.5 hours | 0.3 | 3.7 |
| 24 hours | 0 | 3.7 |

Steroid analysis consists of equilibrating an acidified sample with methyl isbutyl ketone to extract the steroids, chromatographing in a benzene-ethanol-water system on paper to separate components, eluting components and determining concentration by comparing ultraviolet absorption with standards.

In a second experiment carried out as was Example 3, 4 mg. of the cycloborate ester of 9α-fluoro-16α-hydroxyhydrocortisone was converted to 3.48 mg. of triamcinolone per ml. in 21 hours.

In a similar manner, by following the procedures of Examples 1, 2 and 3, the cycloborate esters of any other 16α,17α-dihydroxy steroid of the 3-keto-Δ⁴-pregnene series can be converted to its 1-dehydro derivative.

This invention may be variously otherwise embodied within the scope of the appended claims.

What is claimed is:

1. In a process for the enzymatic 1-dehydrogenation of a steroid of the 16α,17α-dihydroxy-3-keto-Δ⁴-pregnene series to its 1-dehydro derivative by treatment with enzymes of a 1-dehydrogenating microorganism, the improvement which comprises conducting the process in an aqueous medium employing as the steroid substrate a water-soluble 16,17-cycloborate ester of a steroid of the 16α,17α-dihydroxy-3-keto-Δ⁴-pregnene series.

2. The process of claim 1 wherein the steroid substrate is an alkali metal salt of 9α-fluoro-16α-hydroxyhydrocortisone 16,17-cycloborate.

3. The process of claim 1 wherein the steroid substrate is sodium 9α-fluoro-16α-hydroxyhydrocortisone 16,17-cycloborate.

4. A process for preparing triamcinolone which comprises subjecting a water-soluble 16,17-cycloborate ester of 9α-fluoro-16α-hydroxyhydrocortisone to the action of enzymes of the microorganism *Corynebacterium simplex* in an aqueous medium.

References Cited in the file of this patent
UNITED STATES PATENTS
2,844,513    Wettstein et al. _____ July 22, 1958

OTHER REFERENCES
Prescott et al.: Industrial Microbiology, 3rd edition, McGraw-Hill Book Company, Inc., New York, 1959, pages 748, 749 and 735–756.